US012665357B2

(12) United States Patent
Uchida

(10) Patent No.: US 12,665,357 B2
(45) Date of Patent: Jun. 23, 2026

(54) CONNECTOR WITH TEMPERATURE SENSOR IN TERMINAL

(71) Applicant: SUMITOMO WIRING SYSTEMS, LTD., Mie (JP)

(72) Inventor: Masashi Uchida, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 353 days.

(21) Appl. No.: 18/420,182

(22) Filed: Jan. 23, 2024

(65) Prior Publication Data

US 2024/0266787 A1 Aug. 8, 2024

(30) Foreign Application Priority Data

Feb. 2, 2023 (JP) ................................ 2023-014445

(51) Int. Cl.
*H01R 13/66* (2006.01)

(52) U.S. Cl.
CPC ................................ *H01R 13/6683* (2013.01)

(58) Field of Classification Search
None
See application file for complete search history.

(56) References Cited

U.S. PATENT DOCUMENTS

| | | | | |
|---|---|---|---|---|
| 10,644,463 | B2 * | 5/2020 | Tanizaki | H01R 13/6683 |
| 2018/0048090 | A1 * | 2/2018 | Kawai | H01R 13/5829 |
| 2018/0219316 | A1 * | 8/2018 | Suzuki | H01R 13/447 |
| 2019/0334293 | A1 * | 10/2019 | Iwami | B60L 53/16 |
| 2021/0384682 | A1 * | 12/2021 | Yamanashi | H01R 13/6683 |

* cited by examiner

*Primary Examiner* — Tho D Ta
(74) *Attorney, Agent, or Firm* — Venjuris, P.C.

(57) ABSTRACT

A connector includes a housing, a terminal, a holding component and a temperature sensor. The holding component includes a terminal accommodating portion and a temperature sensor accommodating portion continuous with the terminal accommodating portion in a second direction orthogonal to a first direction. The temperature sensor accommodating portion includes a facing wall portion, a pair of side wall portions and an insertion opening open in the first direction. The pair of side wall portions include deflectable and deformable resilient pieces, and the resilient piece includes a locking portion for retaining the temperature sensor inside the temperature sensor accommodating portion. The facing wall portion is formed with a pressing portion projecting into the temperature sensor accommodating portion. A minimum value of an interval in the second direction between the pressing portion and an outer surface of the terminal is smaller than a dimension in the second direction of the temperature sensor.

3 Claims, 14 Drawing Sheets

CONNECTOR WITH TEMPERATURE SENSOR IN TERMINAL

CROSS-REFERENCE TO RELATED APPLICATIONS

This application is based on and claims priority from Japanese Patent Application No. 2023-014445, filed on Feb. 2, 2023, with the Japan Patent Office, the disclosure of which is incorporated herein in its entirety by reference.

TECHNICAL FIELD

The present disclosure relates to a connector.

BACKGROUND

A high-voltage connector to be installed in a vehicle such as an electric vehicle is conventionally known from Japanese Patent Laid-open Publication No. 2021-190364. This connector is provided with a terminal, a housing for accommodating the terminal and a temperature sensor for detecting a temperature of the terminal, and can prevent an overcurrent from a power supply to an electrical device based on a detection result of the temperature sensor.

SUMMARY

The connector described in Japanese Patent Laid-open Publication No. 2021-190364 is formed such that the terminal is assembled with a holding member after the temperature sensor is assembled with the holding member. On the other hand, the assembly of the temperature sensor with the holding member after the terminal is assembled with the holding member is not described in detail.

Further, in the connector of Japanese Patent Laid-open Publication No. 2021-190364, the temperature sensor is pressed against the terminal by a projecting portion formed on a resiliently deformable pressing arm. Thus, under a vibration environment such as a vehicle, a contact state of the temperature sensor with the terminal possibly becomes unstable due to the resilient deformation of the pressing arm. As a result, the accuracy of temperature measurement by the temperature sensor may be reduced.

The present disclosure was completed on the basis of the above situation and aims to enhance the assemblability of a temperature sensor and improve the accuracy of temperature measurement by satisfactorily bringing a terminal and the temperature sensor into contact with each other in a high-voltage connector.

The present disclosure is directed to a connector with a housing, a terminal, a holding component for holding the terminal and a temperature sensor for measuring a temperature of the terminal, the housing including a housing body portion and a through hole penetrating through the housing body portion in a first direction, the holding component being assemblable with the housing by being inserted into the through hole while holding the terminal, the holding component including a terminal accommodating portion for accommodating the terminal and a temperature sensor accommodating portion disposed to be continuous with the terminal accommodating portion in a second direction orthogonal to the first direction, the temperature sensor accommodating portion including a facing wall portion facing the temperature sensor in the second direction, a pair of side wall portions facing the temperature sensor in a third direction orthogonal to the first and second directions and an insertion opening open in the first direction with the holding component assembled with the housing, each of the pair of side wall portions including a deflectable and deformable resilient piece on an opening edge part of the insertion opening, the resilient piece including a locking portion for retaining the temperature sensor inside the temperature sensor accommodating portion, the facing wall portion being formed with a pressing portion projecting into the temperature sensor accommodating portion, and a minimum value of an interval in the second direction between the pressing portion and an outer surface of the terminal being set to be smaller than a dimension in the second direction of the temperature sensor.

According to the present disclosure, the assemblability of a temperature sensor can be enhanced and a terminal and the temperature sensor can be satisfactorily brought into contact with each other in a connector.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
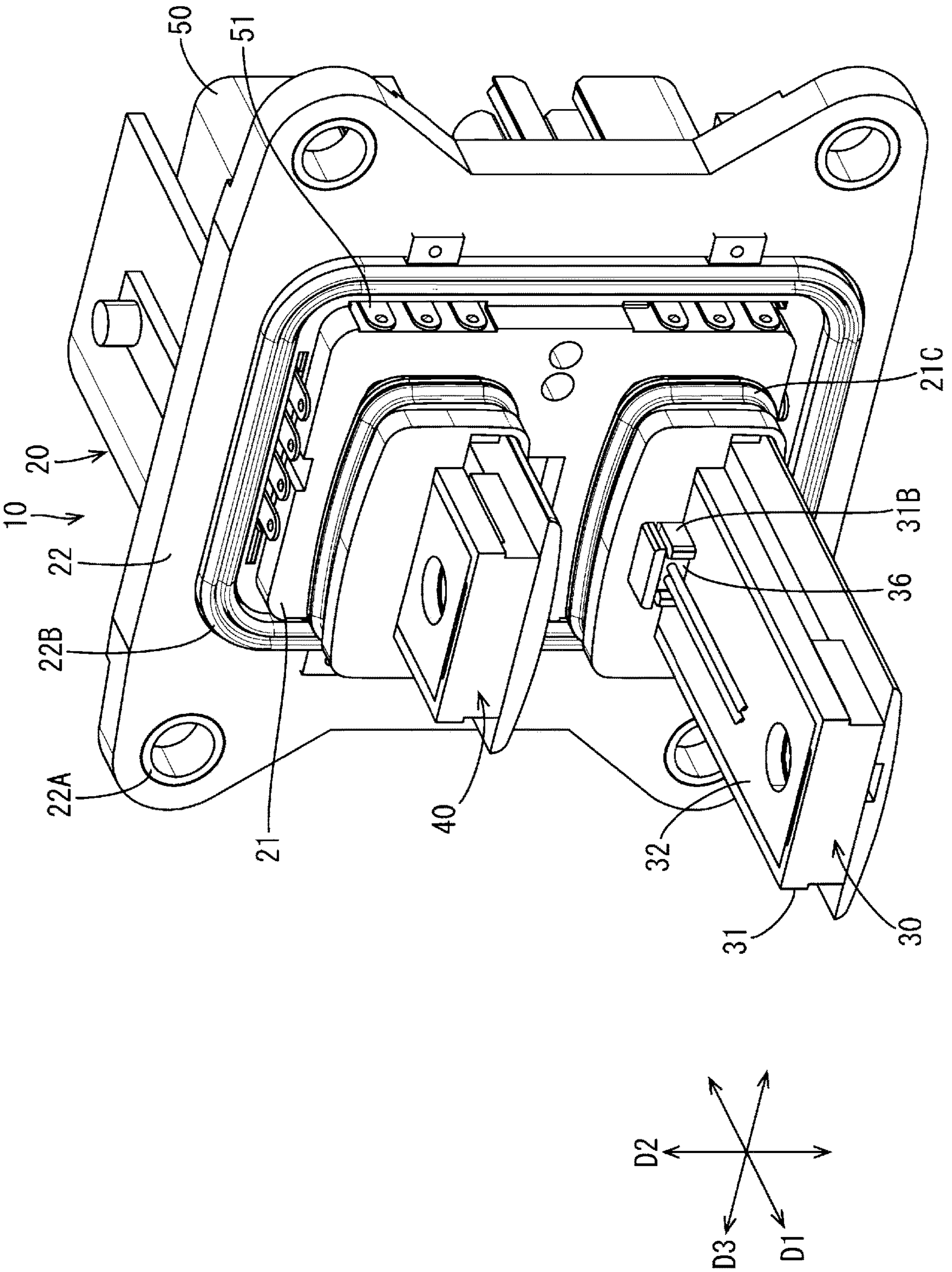
FIG. 1 is a perspective view of a connector according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

[Description of Embodiments of Present Disclosure]

First, embodiments of the present disclosure are listed and described.

[1] The connector of the present disclosure is provided with a housing, a terminal, a holding component for holding the terminal and a temperature sensor for measuring a temperature of the terminal, the housing including a housing body portion and a through hole penetrating through the housing body portion in a first direction, the holding component being assemblable with the housing by being inserted into the through hole while holding the terminal, the holding component including a terminal accommodating portion for accommodating the terminal and a temperature sensor accommodating portion disposed to be continuous with the terminal accommodating portion in a second direction orthogonal to the first direction, the temperature sensor accommodating portion including a facing wall portion facing the temperature sensor in the second direction, a pair of side wall portions facing the temperature sensor in a third direction orthogonal to the first and second directions and an insertion opening open in the first direction with the holding component assembled with the housing, each of the pair of side wall portions including a deflectable and deformable resilient piece on an opening edge part of the insertion opening, the resilient piece including a locking portion for retaining the temperature sensor inside the temperature sensor accommodating portion, the facing wall portion being formed with a pressing portion projecting into the temperature sensor accommodating portion, and a minimum value of an interval in the second direction between the pressing portion and an outer surface of the terminal being set to be smaller than a dimension in the second direction of the temperature sensor.

According to this configuration, the temperature sensor can be inserted into the temperature sensor accommodating portion through the insertion opening with the holding component holding the terminal assembled with the housing. The resilient pieces are deflected in inserting the temperature sensor into the insertion opening, and restored to a natural state after the temperature sensor is accommodated into the temperature sensor accommodating portion, whereby the temperature sensor can be retained inside the temperature sensor accommodating portion by the locking portions.

[2] Preferably in [1] described above, the pressing portion is in the form of a rib extending in the first direction, and a projection amount of the pressing portion into the temperature sensor accommodating portion increases from the insertion opening toward back of the temperature sensor accommodating portion in the first direction.

According to this configuration, since the pressing portion is in the form of a rib, an insertion force of the temperature sensor into the temperature sensor accommodating portion can be reduced by making a contact part of the pressing portion with the temperature sensor smaller. Further, since the projection amount of the pressing portion increases from the insertion opening toward the back of the temperature sensor accommodating portion in the first direction, the temperature sensor can be sufficiently pressed against the terminal inside the temperature sensor accommodating portion while the insertion of the temperature sensor is guided.

[3] Preferably in [1] or [2] described above, the terminal accommodating portion includes a bottom wall portion configured to contact the terminal from a side opposite to the temperature sensor in the second direction.

According to this configuration, the temperature sensor and the terminal can be sandwiched and arranged between the pressing portion and the bottom wall portion in the second direction. Thus, the contact of the temperature sensor and the terminal is easily ensured.

[Details of Embodiment of Present Disclosure]

A specific example of a connector of the present disclosure is described below with reference to the drawings. Note that the present invention is not limited to these illustrations, but is represented by claims and intended to include all changes in the scope of claims and in the meaning and scope of equivalents. For the convenience of description, some components may be shown in an exaggerated or simplified manner in each drawing. Further, a dimension ratio of each part may be different in each figure. “Parallel”, “perpendicular” and “orthogonal” in this specification mean not only strictly parallel, perpendicular and orthogonal, but also substantially parallel, perpendicular and orthogonal within a range in which functions and effects in this embodiment are achieved.

In each figure, three directions perpendicular to each other are shown and these three directions are respectively shown as a first direction D1, a second direction D2 and a third direction D3. That is, the first and second directions D1, D2 are perpendicular to each other, the first and third directions D1, D3 are perpendicular to each other and the second and third directions D2, D3 are perpendicular to each other. Since arrows are drawn on both sides of a solid line indicating each direction, not only a direction of the arrow on a side where a sign is attached, but also a direction of the arrow on a side where no sign is attached indicates this direction.

Further, a term “tubular” used in the description of this specification indicates not only a shape formed by a peripheral wall continuous over an entire periphery in a circumferential direction, but also a shape formed by combining a plurality of components and a shape having a cut or the like in a circumferential part such as a C shape. Further, the “tubular” shapes include circular shapes, elliptical shapes and polygonal shapes with angular or rounded corners.

Further, a term “ring” in this specification means an arbitrary closed shape having an outer edge connected by straight lines or curves, including a circular ring having a circular outer edge, a ring having an elliptical or oval outer edge, a polygonal ring having a polygonal outer edge and a ring having a polygonal outer edge with rounded corners. The “ring” may be shaped such that an outer edge shape and an inner edge shape have the same shape or may be shaped such that an outer edge shape and an inner edge shape are different. The “ring” may have a predetermined length along a center axis direction, and the length does not matter. Further, an “annular shape” in this specification only has to be regarded as a ring as a whole and may include a cut, a slit or the like in a part such as a C shape.

Further, “facing each other” in this specification indicates that surfaces or members are at positions in front of each other, and means not only a case where the surfaces or members are at positions perfectly in front of each other, but also a case where the surfaces or members are partially in front of each other. Further, “facing each other” in this specification means both a case where another member different from two parts is interposed between the two parts and a case where nothing is interposed between the two parts.

<Embodiment>

(Configuration of Connector 10)

A connector 10 is to be connected to a mating device for vehicle (not shown). The mating device is, for example, a high-voltage battery, a motor or the like for drive. The mating device is provided with an enclosure made of an electrically conductive metal material and a device-side housing and device-side terminals provided in the enclosure.

As shown in FIG. 1, the connector 10 is provided with a housing 20, two terminal assemblies 30, 40 disposed side by side in the second direction D2 (vertical direction), and a temperature sensor 36. Out of the two terminal assemblies 30, 40, the lower one is a first terminal assembly 30 and the upper one is a second terminal assembly 40. The first terminal assembly 30 is longer than the second terminal assembly 40 in the first direction D1 (front-rear direction)

and includes a temperature sensor accommodating portion 31B, which is not provided in the second terminal assembly 40. Since the configurations of the respective terminal assemblies 30, 40 are substantially similar in other points, the first terminal assembly 30 is described as a representative below.

(Configuration of Housing 20)

Figure 3:
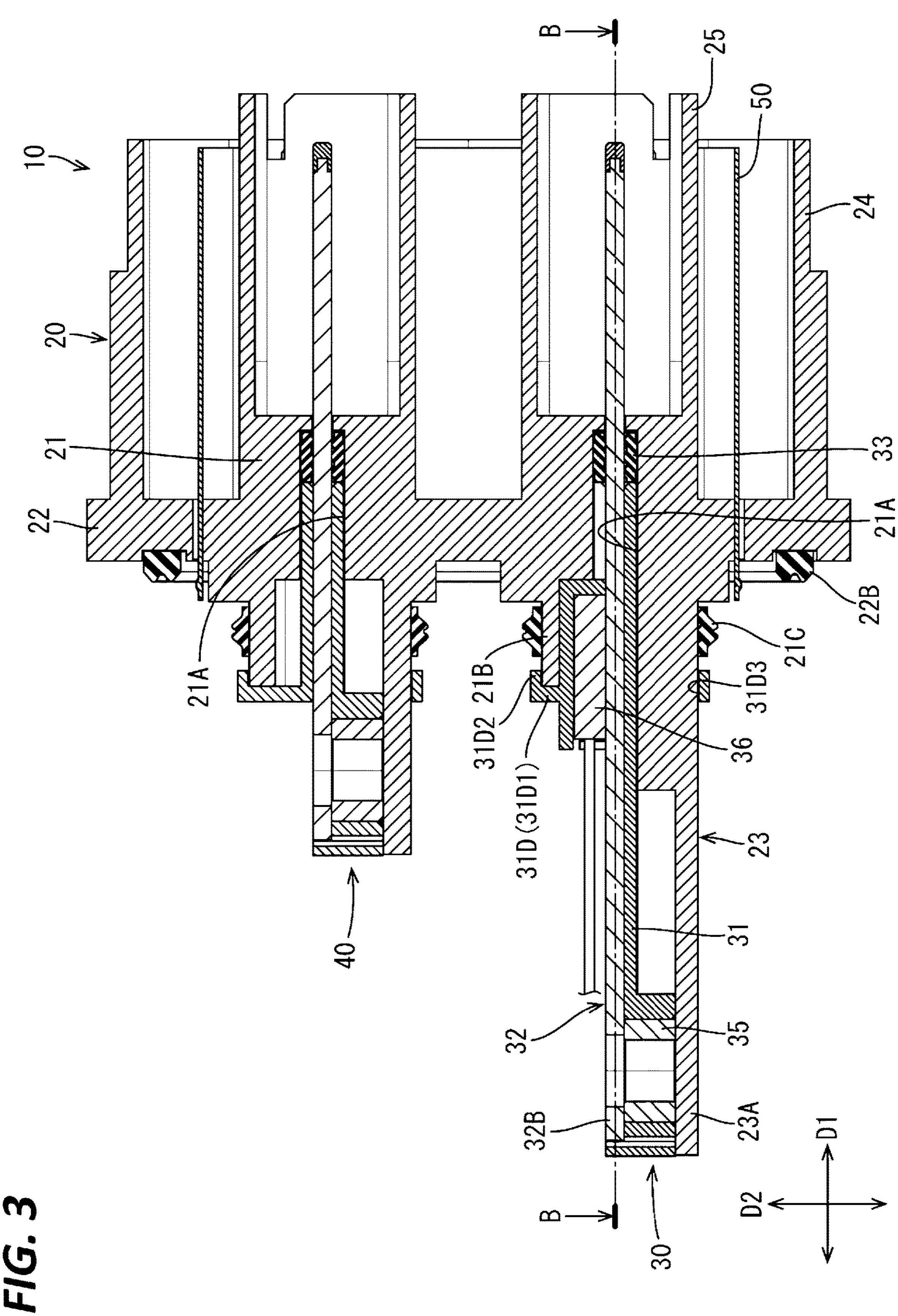
FIG. 3 is a section along A-A of FIG. 2.

As shown in FIG. 3, the housing 20 is provided with a housing body portion 21, a mounting plate 22 protruding toward an outer peripheral side of the housing body portion 21, two nut holding walls 23 disposed side by side in the second direction D2, a receptacle 24 and two terminal accommodation walls 25 disposed side by side in the second direction D2. A resin material such as polybutylene terephthalate (PBT) can be cited as a material of the housing 20.

(Configuration of Housing Body Portion 21)

Figure 2:
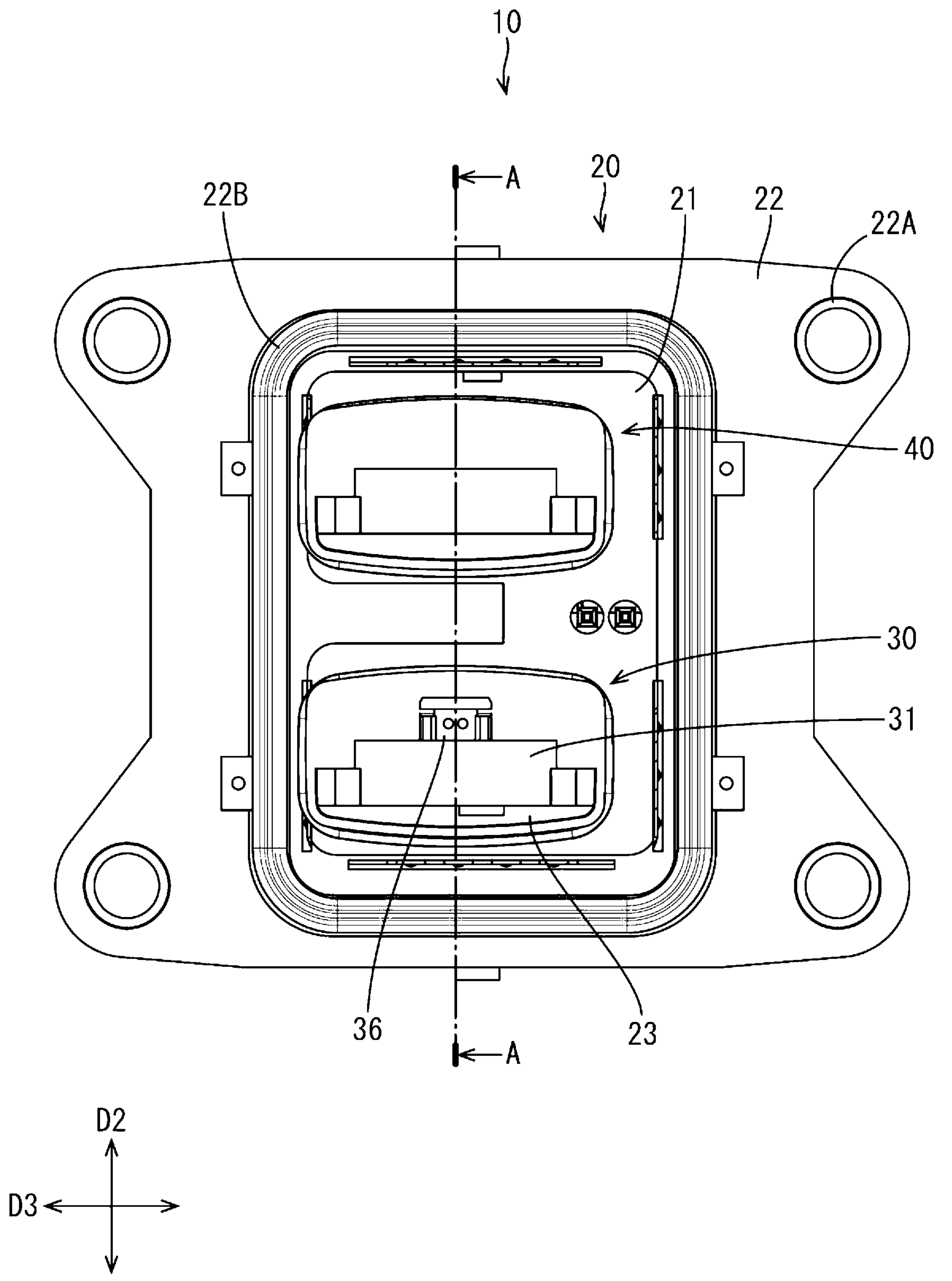
FIG. 2 is a front view of the connector.

The housing body portion 21 includes through holes 21A, into which the respective terminal assemblies 30, 40 are mounted. The housing body portion 21 includes fitting portions 21B, which are parts to be fit to a device-side housing. As shown in FIG. 2, the housing body portion 21 is in the form of a substantially rectangular block long in the vertical direction when viewed from the first direction D1.

Figure 4:
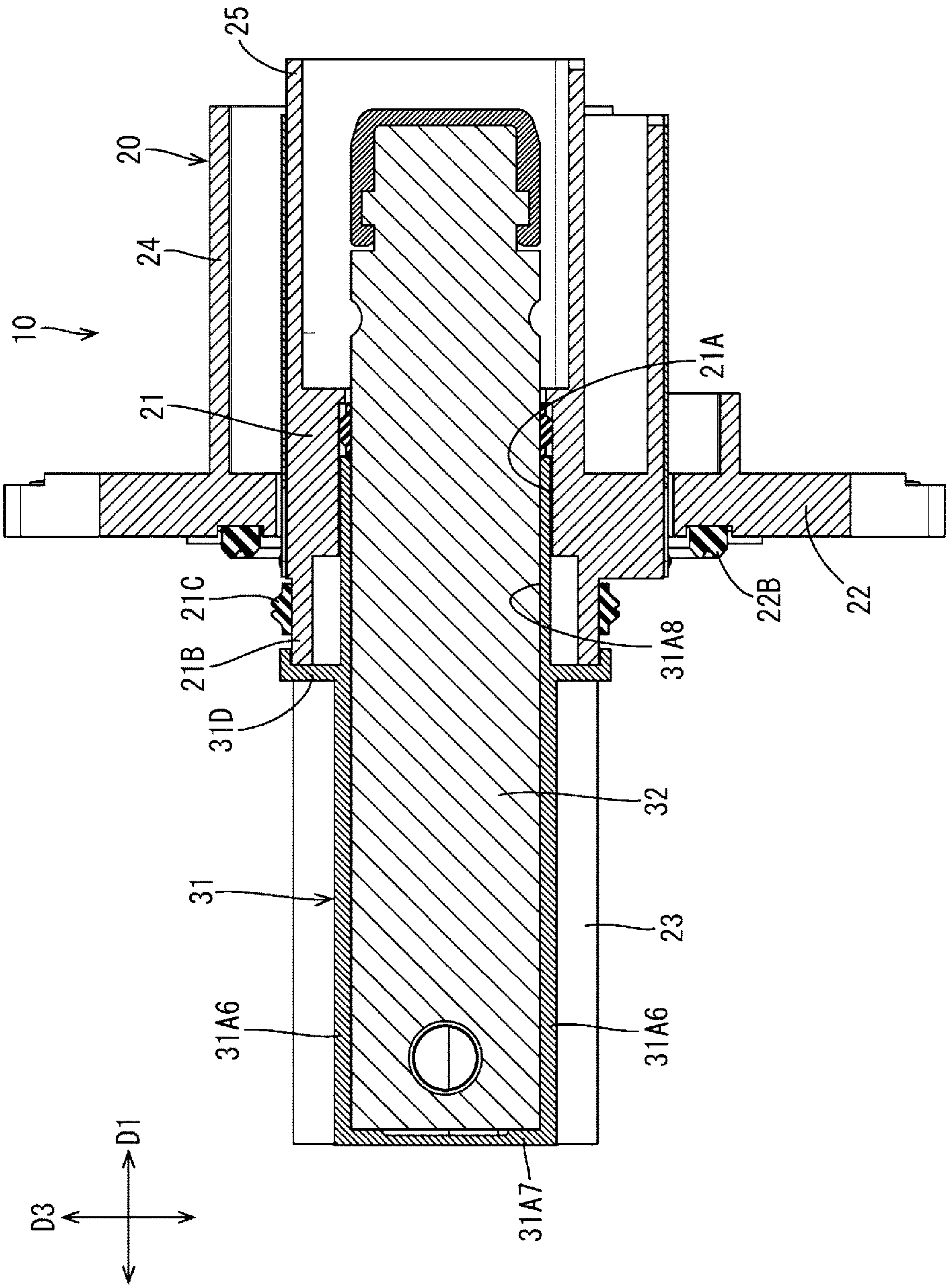
FIG. 4 is a section along B-B of FIG. 3.

As shown in FIG. 4, an annular first sealing member 21C is mounted on the outer peripheral surface of the fitting portion 21B. The first sealing member 21C is a shaft seal. If the fitting portion 21B is fit to the device-side housing, the first sealing member 21C is compressed over an entire periphery by the outer peripheral surface of the fitting portion 21B and the inner peripheral surface of the device-side housing, whereby the inside of the device-side housing is sealed.

(Configuration of Mounting Plate 22)

As shown in FIG. 2, the mounting plate 22 is a part protruding in the second and third directions D2, D3 from the outer peripheral surface of the housing body portion 21. The mounting plate 22 is in the form of a substantially rectangular plate when viewed from the first direction D1. Collars 22A made of metal are fixed at four corners of the mounting plate 22 by press-fitting or insert molding. The connector 10 is mounted and fixed to the mating device by inserting bolts into the collars 22A and tightening the bolts into bolt holes of the enclosure.

As shown in FIG. 1, a second sealing member 22B is mounted on a surface of the mounting plate 22 facing the enclosure. The second sealing member 22B is a surface seal. If the connector 10 is mounted on the mating device, the second sealing member 22B is compressed by the enclosure and the mounting plate 22 and the inside of the enclosure is sealed.

As shown in FIG. 3, a shield member 50 made of metal is mounted between the housing body portion 21 and the mounting plate 22. The shield member 50 is substantially in the form of a rectangular tube when viewed from the first direction D1. A part of the terminal 32 disposed outside the enclosure is located inside the shield member 50. As shown in FIG. 1, the shield member 50 includes a plurality of contact pieces 51 to be brought into contact with the enclosure when the connector 10 is mounted on the mating device.

(Configuration of Nut Holding Wall 23)

Figure 10:
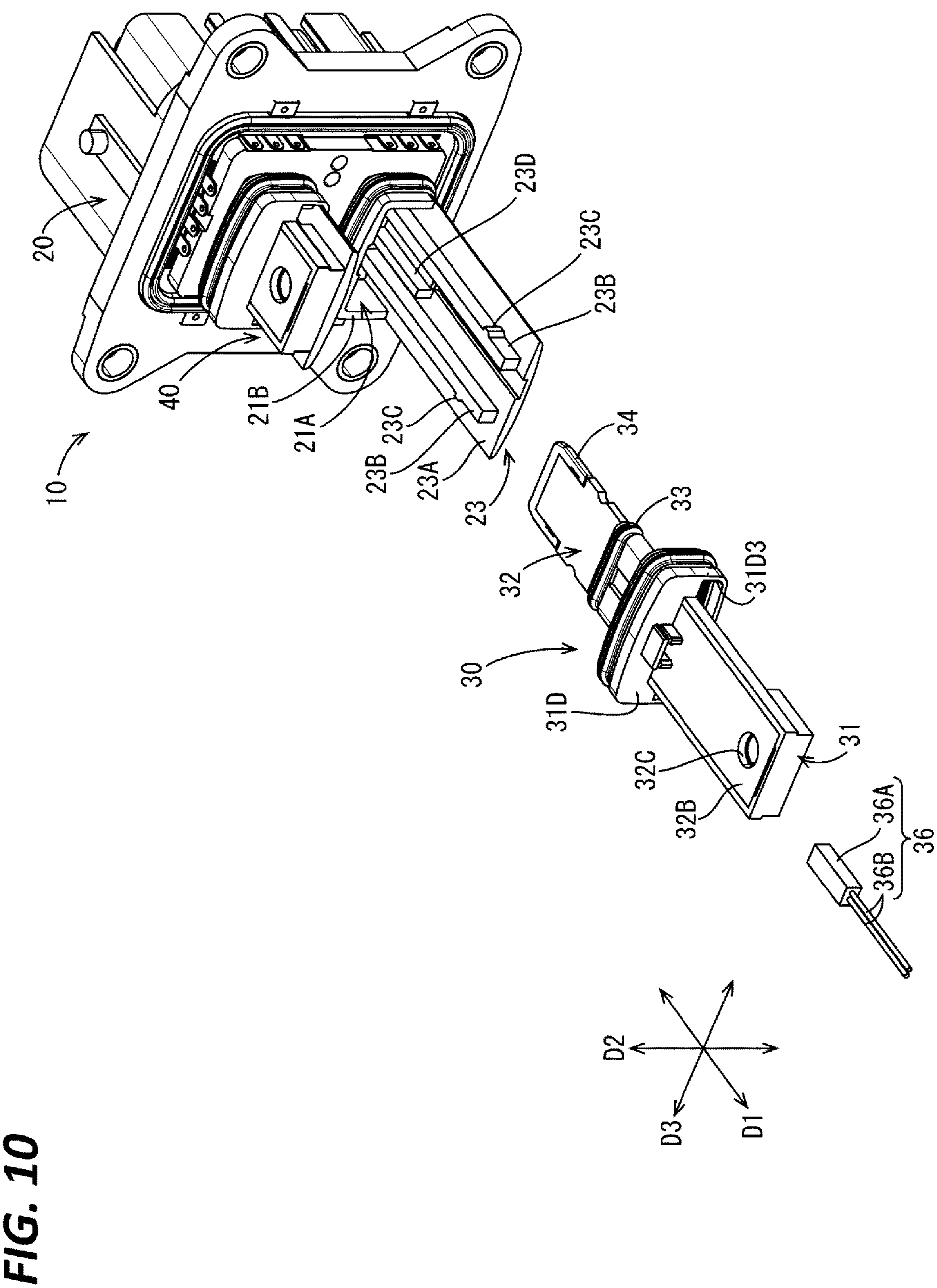
FIG. 10 is an exploded perspective view of the connector.

As shown in FIG. 10, the nut holding wall 23 includes a plate-like base plate portion 23A formed to project in the first direction D1 from the bottom wall of the fitting portion 21B and a pair of side plate portions 23B projecting inwardly (upwardly) of the through hole 21A in the second direction D2 from the upper surface of the base plate portion 23A and extending in the first direction D1. The pair of side plate portions 23B are disposed side by side in parallel in the third direction D3. The tip of the side plate portion 23B is disposed between the opening edge of the fitting portion 21B and the tip of the base plate portion 23A. A pair of locked portions 23C are provided on the outer side surfaces of the pair of side plate portions 23B. A supporting portion 23D is formed between the pair of side plate portions 23B in the third direction D3. The supporting portion 23D projects upward from the base plate portion 23A. The supporting portion 23D is disposed at a position of the base plate portion 23A near the fitting portion 21B, and extends in the first direction D1.

As shown in FIG. 3, a nut 35 is supported by the base plate portion 23A with the first terminal assembly 30 mounted in the housing body portion 21. Since the nut 35 is fit and accommodated between the base plate portion 23A and a terminal connecting portion 32B of the terminal 32, the nut 35 is held positioned in the second direction D2. The nut 35 temporarily held by the holding component 31 is held in the holding component 31 by the base plate portion 23A and suppressed from being separated from the holding component 31.

Figure 9:
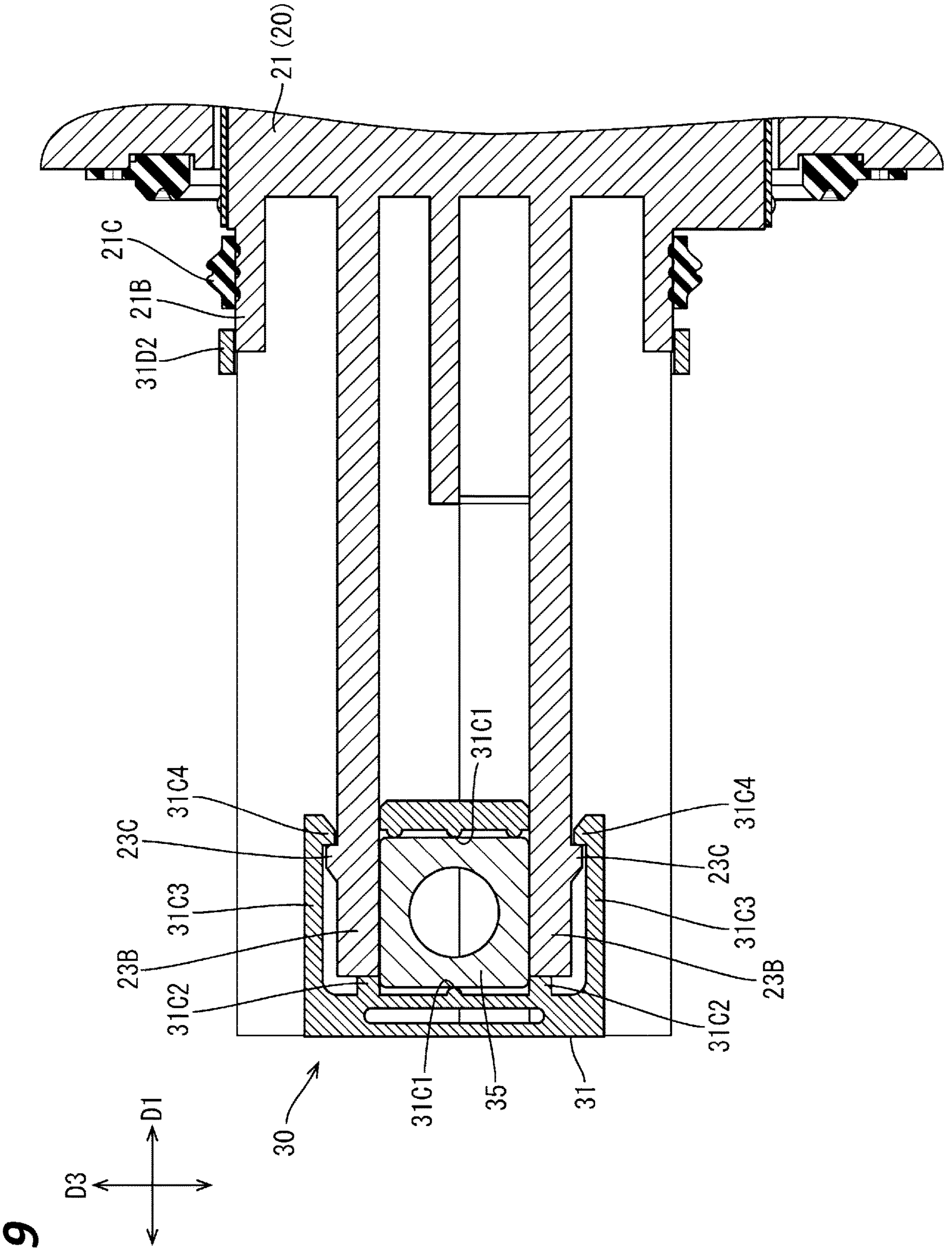
FIG. 9 is a section along D-D of FIG. 5.

As shown in FIG. 9, the nut 35 is fit and accommodated between the pair of side plate portions 23B with the first terminal assembly 30 mounted in the housing body portion 21. Even if the nut 35 rotates in fastening the device-side terminal and the terminal 32, the rotation and position shift of the nut 35 are suppressed by the engagement of the pair of side plate portions 23B with the outer peripheral surface of the nut 35.

(Configurations of Receptacle 24 and Terminal Accommodation Walls 25)

As shown in FIG. 3, the receptacle 24 is formed to project from the mounting plate 22 toward a side opposite to the fitting portion 21B. The receptacle 24 has a substantially rectangular tube shape when viewed from the first direction D1. A pair of the terminal accommodation walls 25 are accommodated inside the receptacle 24. The terminal accommodation wall 25 has a substantially rectangular tube shape when viewed from the first direction D1. The respective terminal accommodation walls 25 are disposed at positions corresponding to the pair of upper and lower through holes 21A. The inside of the terminal accommodation wall 25 and the corresponding through hole 21A communicate.

An end opening of the through hole 21A on the side of the terminal accommodation wall 25 is formed in such a size that only the terminal 32 can be passed. Thus, a third sealing member 33 to be described later is held inside the housing body portion 21 and does not protrude toward the terminal accommodation wall 25 through the through hole 21A in the case of inserting the third sealing member 33 into the through hole 21A together with the terminal 32. Therefore, only the terminal 32 is disposed to project into the terminal accommodation wall 25 from the housing body portion 21.

(Configuration of First Terminal Assembly 30)

Figure 11:
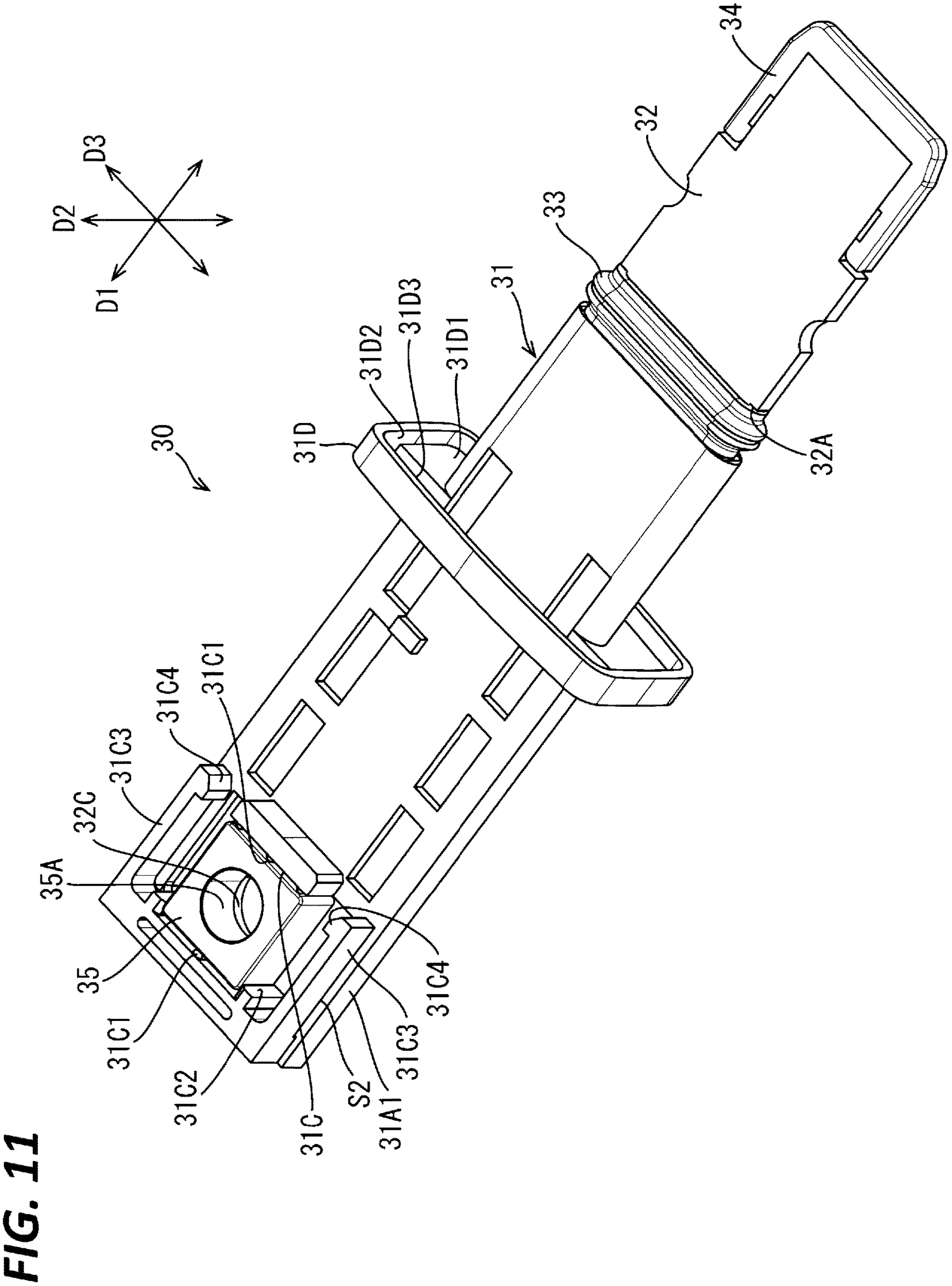
FIG. 11 is a perspective view of a first terminal assembly when viewed obliquely from a lower front side.

As shown in FIG. 11, the first terminal assembly 30 is provided with the holding component 31, the terminal 32, the third sealing member 33, an insulating member 34 and the nut 35. The terminal 32 and the device-side terminal are connected by tightening the bolt into the nut 35. The third sealing member 33 has a laterally long oval ring shape when viewed from the first direction D1.

(Configuration of Terminal 32)

The terminal 32 is in the form of a substantially rectangular plate long in the first direction D1. Metal materials such as iron-based, copper-based and aluminum-based ones can be, for example, cited as a material of the terminal 32. A pair of sealing member mounting portions 32A in the form of grooves are formed on both side edge parts of the terminal 32. If the third sealing member 33 is mounted on the terminal 32 in the first direction D1, inner peripheral lips of the third sealing member 33 are held in close contact with the outer peripheral surfaces of the sealing member mounting portions 32A and the upper and lower surfaces of the terminal 32.

As shown in FIG. 10, the terminal connecting portion 32B is formed on one end part in the first direction D1 of the terminal 32. A bolt insertion hole 32C is formed to penetrate through the terminal connecting portion 32B in a plate thickness direction. On the other hand, the insulating member 34 is mounted on the other end part in the first direction D1 of the terminal 32. The insulating member 34 is made of an insulating resin material. For example, the insulating member 34 may be shaped to be convex-concavely fit to the terminal 32. Further, the insulating member 34 may be integrally provided to the terminal 32 by insert molding.

(Configuration of Nut 35)

As shown in FIG. 11, the nut 35 is, for example, in the form of a quadrangular prism. The nut 35 includes a through hole 35A penetrating through the nut 35 in a thickness direction. The through hole 35A is formed to penetrate from the upper surface to the lower surface of the nut 35. The through hole 35A is, for example, formed to have a circular shape when viewed from a penetration direction (here, the second direction D2) of the through hole 35A. The through hole 35A is, for example, formed in centers of the upper and lower surfaces. The through hole 35A is, for example, disposed coaxially with the bolt insertion hole 32C of the terminal connecting portion 32B with the terminal 32 and the nut 35 mounted in the holding component 31. The nut 35 is, for example, formed to have a rectangular shape in a plan view from the penetration direction of the through hole 35A. The outer peripheral surface of the nut 35 is constituted by four flat outer peripheral side surfaces.

(Configuration of Holding Component 31)

Figure 5:
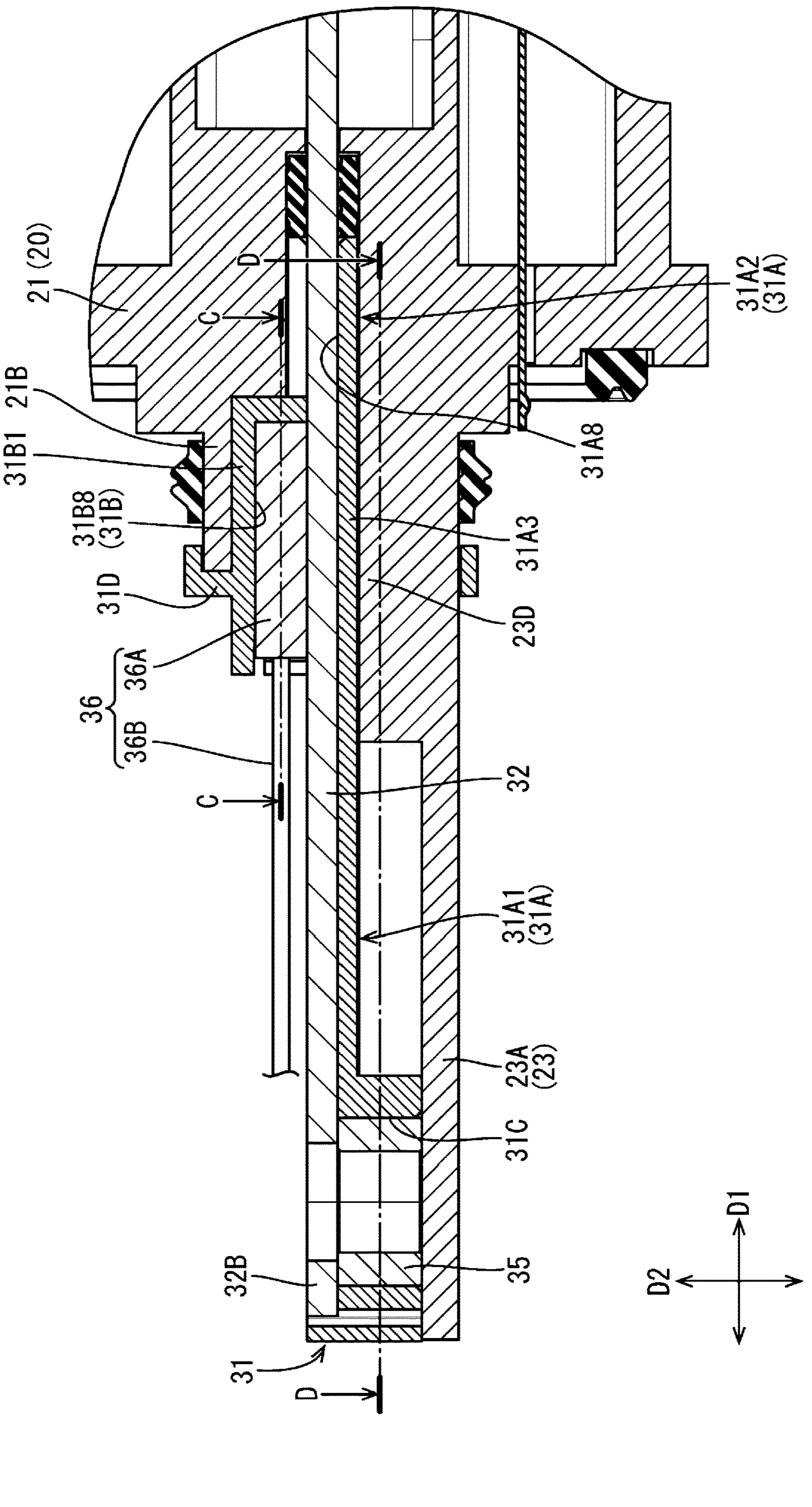
FIG. 5 is an enlarged view of FIG. 3 showing the periphery of a holding component.
Figure 12:
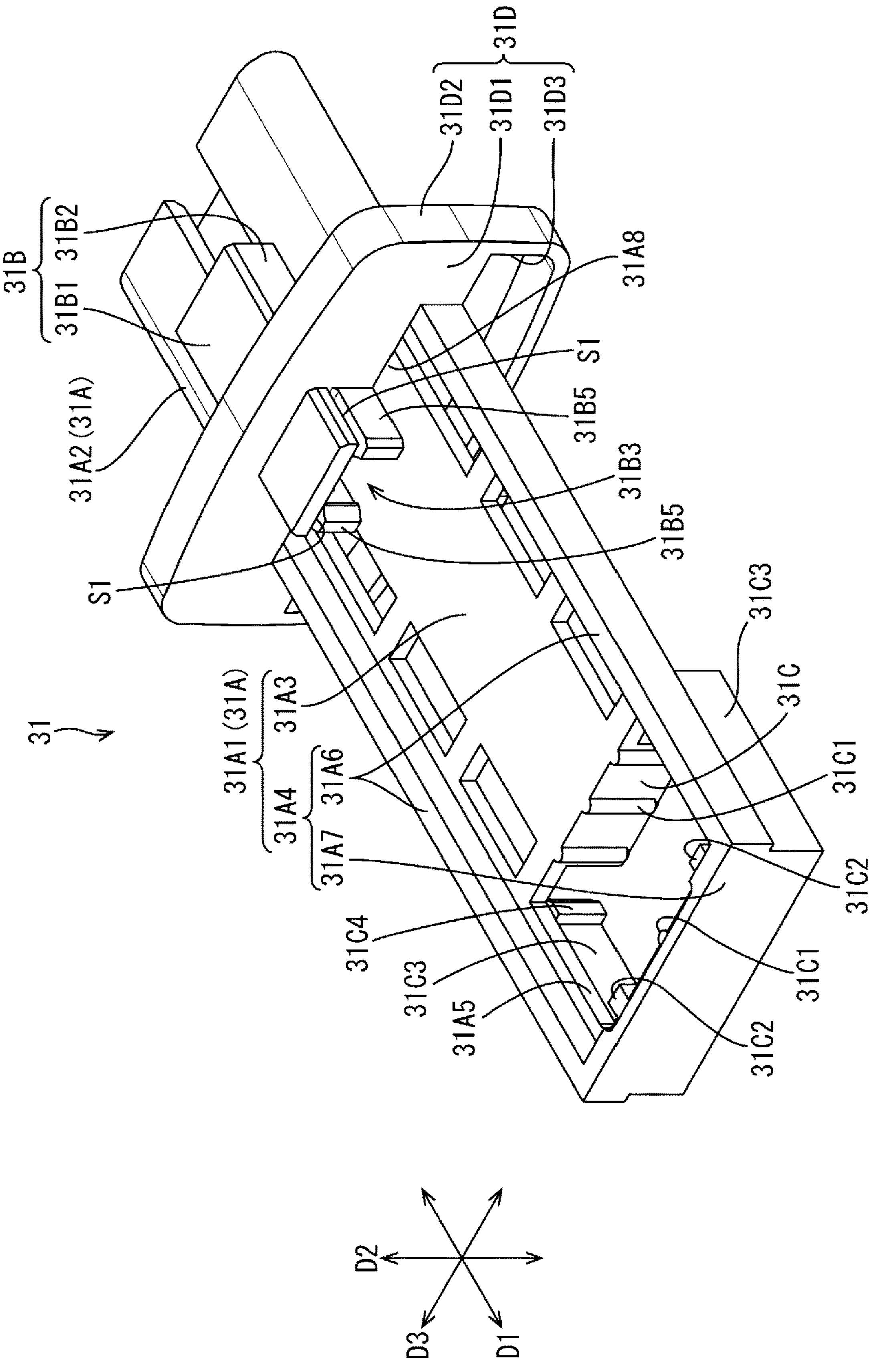
FIG. 12 is a perspective view of the holding component when viewed obliquely from an upper front side.

As shown in FIG. 5, the holding component 31 includes a terminal accommodating portion 31A for accommodating the terminal 32 inside, a temperature sensor accommodating portion 31B for accommodating the temperature sensor 36 inside, a nut accommodating portion 31C for accommodating the nut 35 inside and a plate-like flange portion 31D arranged to be orthogonal to the terminal 32. As shown in FIG. 12, the temperature sensor accommodating portion 31B is provided to be continuous with the terminal accommodating portion 31A. The nut accommodating portion 31C is provided to be continuous with the terminal accommodating portion 31A. The holding component 31 is made of a resin material softer than the housing 20.

(Configuration of Terminal Accommodating Portion 31A)

As shown in FIG. 12, the terminal accommodating portion 31A is provided to penetrate through the flange portion 31D in the first direction D1. The terminal accommodating portion 31A includes a front accommodating portion 31A1 integrally formed to the nut accommodating portion 31C and a rear accommodating portion 31A2 formed on a side opposite to the front accommodating portion 31A1 across the flange portion 31D.

The front accommodating portion 31A1 is in the form of a substantially rectangular frame. The front accommodating portion 31A1 includes a bottom wall portion 31A3, a peripheral wall portion 31A4 extending upward from the bottom wall portion 31A3 and a communication hole 31A5 penetrating through a front part of the bottom wall portion 31A3 in the vertical direction. The inside of the terminal accommodating portion 31A and that of the nut accommodating portion 31C are allowed to communicate by the communication hole 31A5. The peripheral wall portion 31A4 includes a pair of first wall portions 31A6 extending in the first direction D1 and facing each other in the third direction D3 and a second wall portion 31A7 connecting end parts (front end parts) of the pair of first wall portions 31A6 on a side opposite to the flange portion 31D in the third direction D3. As shown in FIG. 5, a front half of the terminal 32 including the terminal connecting portion 32B is accommodated in the front accommodating portion 31A1. The terminal 32 is positioned in the second direction D2 by being supported by the bottom wall portion 31A3. As shown in FIG. 4, the terminal 32 is positioned in the third direction D3 by being held in contact with the pair of first wall portions 31A6. Further, the terminal 32 is held in contact with the second wall portion 31A7 and stopped in front, thereby being positioned in the first direction D1.

As shown in FIG. 12, the rear accommodating portion 31A2 has a laterally long tubular shape and includes a terminal insertion hole 31A8 penetrating in the first direction D1. As shown in FIGS. 4 and 5, the terminal 32 is inserted through the terminal insertion hole 31A8. The terminal 32 comes into contact with a peripheral wall of the terminal insertion hole 31A8, thereby being positioned in the second and third directions D2, D3.

(Configuration of Temperature Sensor Accommodating Portion 31B)

Figure 7:
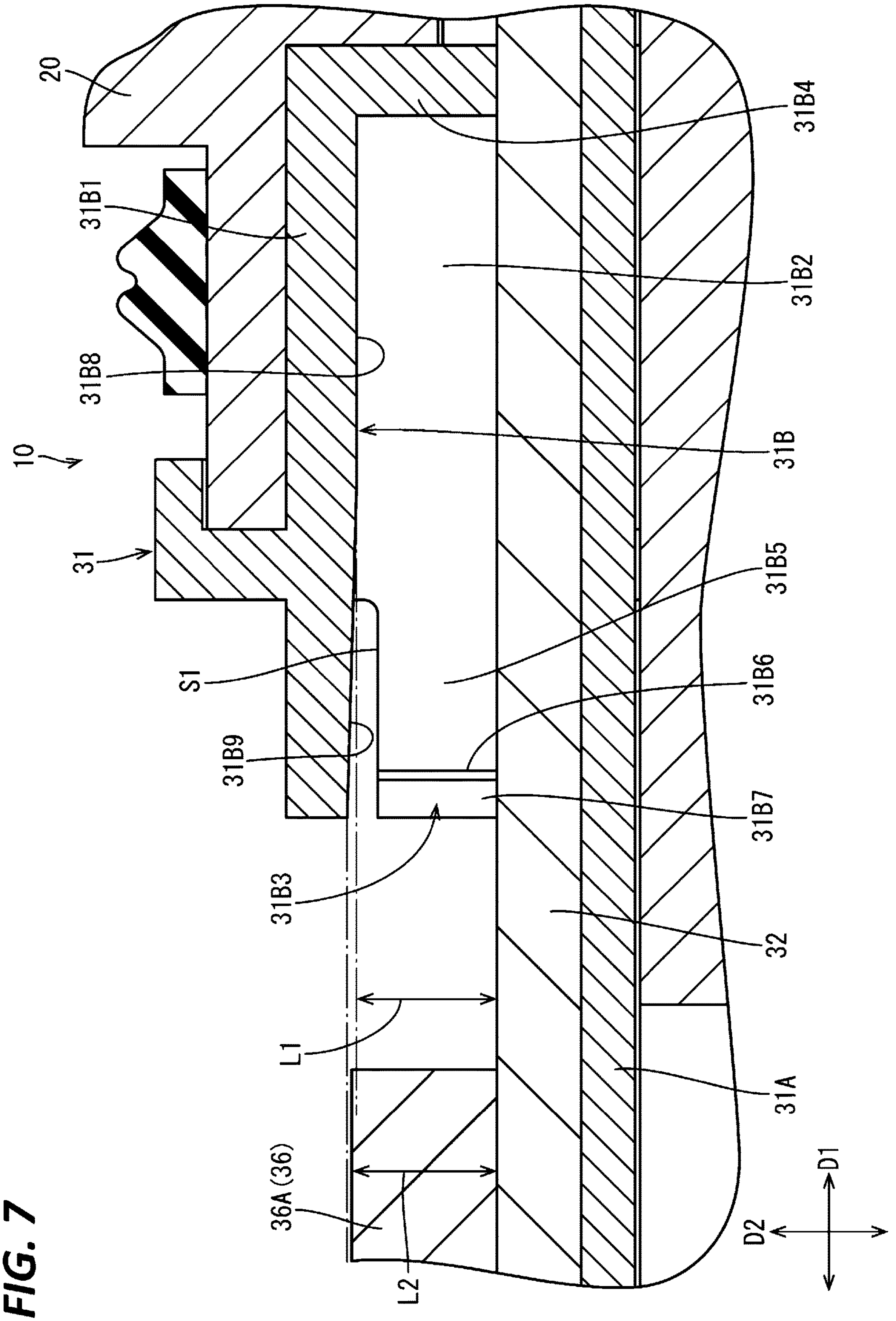
FIG. 7 is an enlarged view of FIG. 6 showing a pressing portion.
Figure 14:
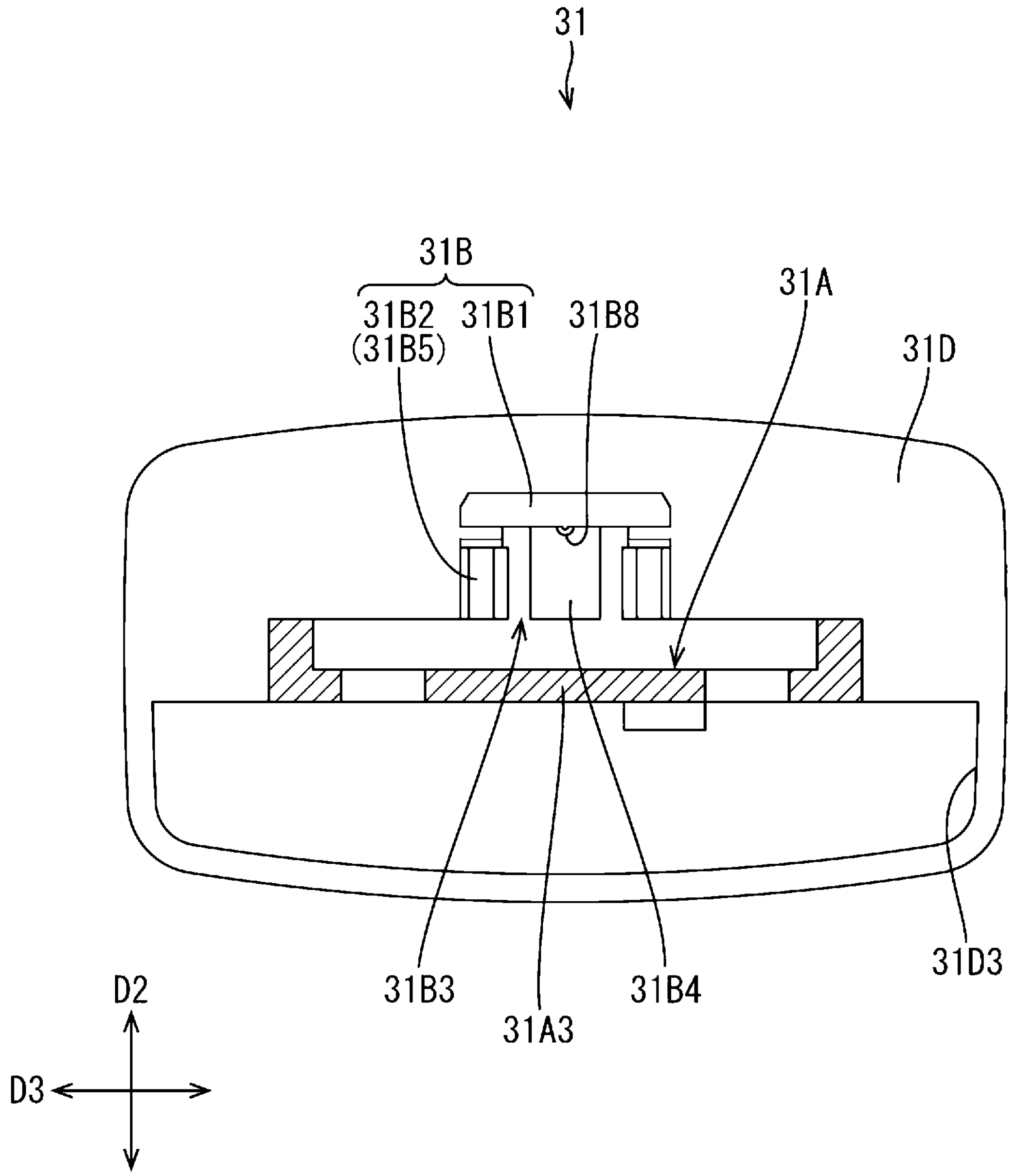
FIG. 14 is a section along E-E of FIG. 13.

As shown in FIG. 14, the temperature sensor accommodating portion 31B is formed to penetrate through the flange portion 31D in the first direction D1. The temperature sensor accommodating portion 31B is disposed to be continuous with the terminal accommodating portion 31A in the second direction D2. As shown in FIG. 12, the temperature sensor accommodating portion 31B includes a facing wall portion 31B1 and a pair of side wall portions 31B2 extending from the facing wall portion 31B1 toward the terminal accommodating portion 31A (downward) in the second direction D2. The pair of side wall portions 31B2 are facing each other in the third direction D3. Further, the temperature sensor accommodating portion 31B includes an insertion opening 31B3 open on the side of the nut accommodating portion 31C (front side) in the first direction D1. The insertion opening 31B is defined by the facing wall portion 31B1 and the pair of side wall portions 31B2. As shown in FIG. 7, the temperature sensor accommodating portion 31B includes a contact wall portion 31B4 disposed on a side (rear side) opposite to the insertion opening 31B3 and extending downward from the facing wall portion 31B1.

Figure 8:
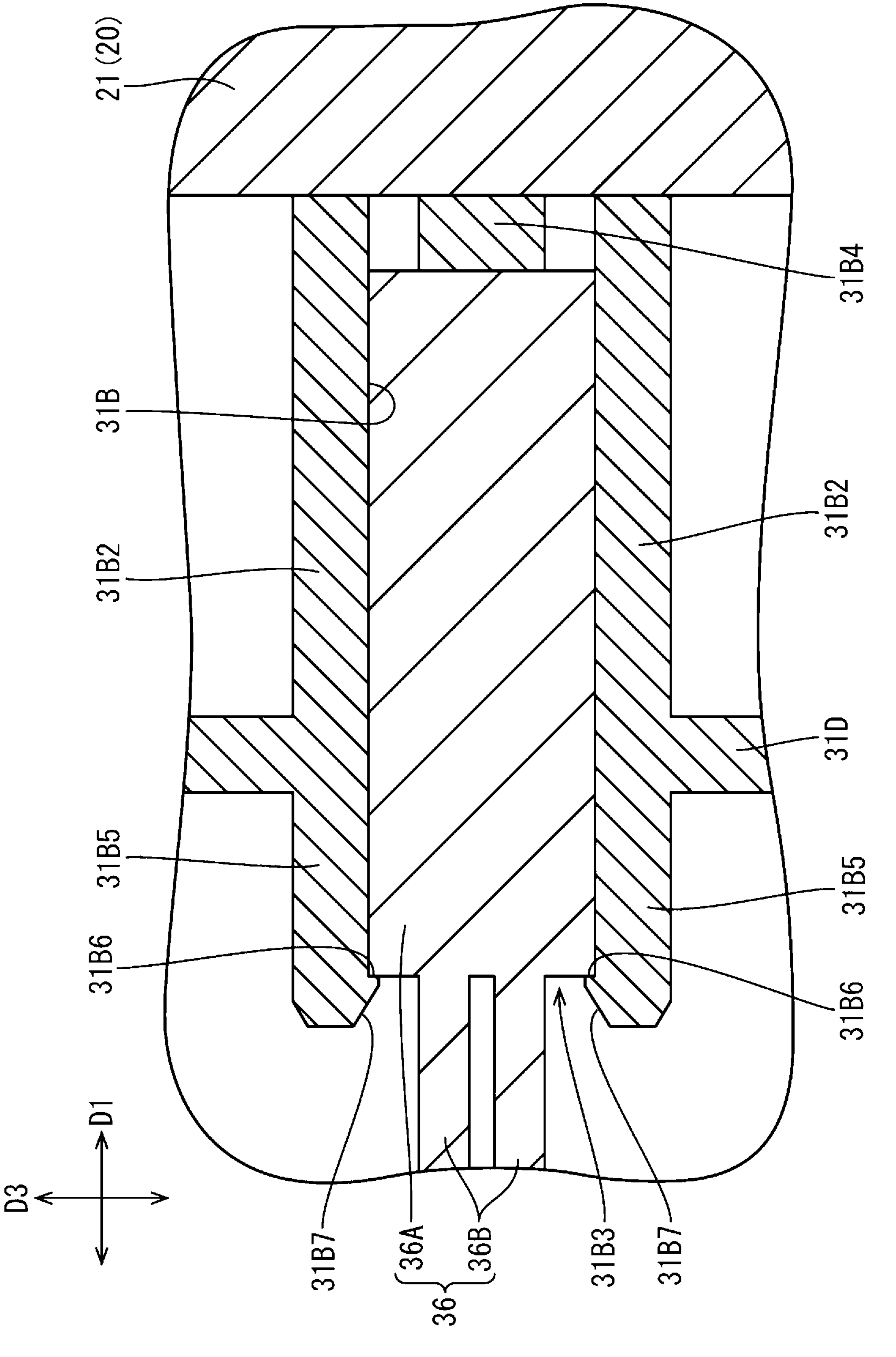
FIG. 8 is a section along C-C of FIG. 5.

As shown in FIG. 12, a pair of slits S1 are formed to extend in the first direction D1 in regions of the pair of side wall portions 31B2 from the flange portion 31D to an opening edge part of the insertion opening 31B3. The slits S1 are open forward. The slits S1 are formed in end parts (upper end parts) of the pair of side wall portions 31B2 on the side of the facing wall portion 31B1. In this way, each side wall portion 31B2 includes a resilient piece 31B5 separated from the facing wall portion 31B1. The resilient piece 31B5 is formed to be deflectable and deformable in the third direction D3 with the side of the flange portion 31D as a base end part. A pair of the resilient pieces 31B5 are arranged to face each other in the third direction D3. As shown in FIG. 8, a pair of locking portions 31B6 are formed on facing parts of free end parts of the pair of resilient pieces 31B5. Each resilient piece 31B5 has a guide surface 31B7 disposed toward the inside of the temperature sensor accommodating portion 31B in the third direction D3 as extending from the insertion opening 31B3 toward the inside of the temperature sensor accommodating portion 31B in the first direction D1.

As shown in FIG. 14, the temperature sensor accommodating portion 31B is formed with a pressing portion 31B8 projecting from the facing wall portion 31B1 into the temperature sensor accommodating portion 31B in the second direction D2. The pressing portion 31B8 of this embodiment is in the form of a rib extending in the first direction D1. Further, as shown in FIG. 7, the pressing portion 31B8 includes an inclined portion 31B9 having a projection amount into the temperature sensor accommodating portion 31B in the second direction D2 increasing from the insertion opening 31B3 toward the back of the temperature sensor accommodating portion 31B in the first direction D1. A minimum value L1 of an interval between the pressing portion 31B8 and the outer surface (upper surface) of the terminal 32 in the terminal accommodating portion 31A in the second direction D2 is set to be smaller than a dimension L2 in the second direction D2 of the temperature sensor 36. Here, the dimension L2 in the second direction D2 of the temperature sensor 36 specifically means a dimension in the second direction D2 of a part to be brought into contact with the pressing portion 31B8, out of a part (sensor body 36A) of the temperature sensor 36 to be accommodated into the temperature sensor accommodating portion 31B.

(Configuration of Temperature Sensor 36)

As shown in FIG. 8, the temperature sensor 36 includes the sensor body 36A and lead wires 36B extending from the sensor body 36A. The sensor body 36A has, for example, a rectangular parallelepiped shape. The sensor body 36A is configured such that a sensor element (not shown) connected to the lead wires 36B is, for example, embedded in a protecting portion made of resin. The sensor element outputs a signal corresponding to a temperature change via the lead wires 36B. The lead wires 36B are electrically connected to a controller (not shown) for controlling the charging of a battery based on a signal from the sensor element. Note that an NTC thermistor, PTC thermistor, PT sensor or the like can be, for example, used as the temperature sensor 36.

The sensor body 36A of the temperature sensor 36 is accommodated inside the temperature sensor accommodating portion 31B, and the lead wires 36B are pulled out through the insertion opening 31B. The sensor body 36A is contacted from behind by the contact wall portion 31B4, and locked from front by the pair of locking portions 31B6. In this way, the sensor body 36A is positioned in the first direction D1. Further, the sensor body 36A is positioned in the third direction D3 by the pair of side wall portions 31B2.

As shown in FIG. 5, the temperature sensor accommodating portion 31B is connected to the terminal accommodating portion 31A in the second direction D2. With the terminal 32 accommodated in the terminal accommodating portion 31A, the upper surface of the terminal 32 is in contact with the lower surface of the sensor body 36A. On the other hand, the upper surface of the sensor body 36A is in contact with the pressing portion 31B8. Here, since the minimum value L1 of the interval in the second direction D2 between the pressing portion 31B and the terminal 32 in the terminal accommodating portion 31A is set to be smaller than the dimension L2 in the second direction D2 of the sensor body 36A as shown in FIG. 7, the sensor body 36A is pressed against the terminal 32 by the pressing portion 31B8. Thus, the sensor body 36A and the terminal 32 can be sufficiently in contact with each other, wherefore a temperature of the terminal 32 can be accurately measured by the temperature sensor 36.

As shown in FIG. 5, the terminal 32 is supported by the bottom wall portion 31A3 of the terminal accommodating portion 31A below the temperature sensor accommodating portion 31B. Thus, the temperature sensor 36 and the terminal 32 can be sandwiched and arranged between the pressing portion 31B8 and the bottom wall portion 31A3 in the second direction D2, and the contact of the temperature sensor 36 and the terminal 32 can be more easily ensured.

Further, below the temperature sensor accommodating portion 31B, the bottom wall portion 31A is supported from below by the supporting portion 23D of the housing 20 and the facing wall portion 31B1 is contacted from above by the fitting portion 21B of the housing 20. Thus, the temperature sensor 36 and the terminal 32 can be more firmly sandwiched between the pressing portion 31B8 and the bottom wall portion 31A3 in the second direction D2.

(Configuration of Nut Accommodating Portion 31C)

Figure 13:
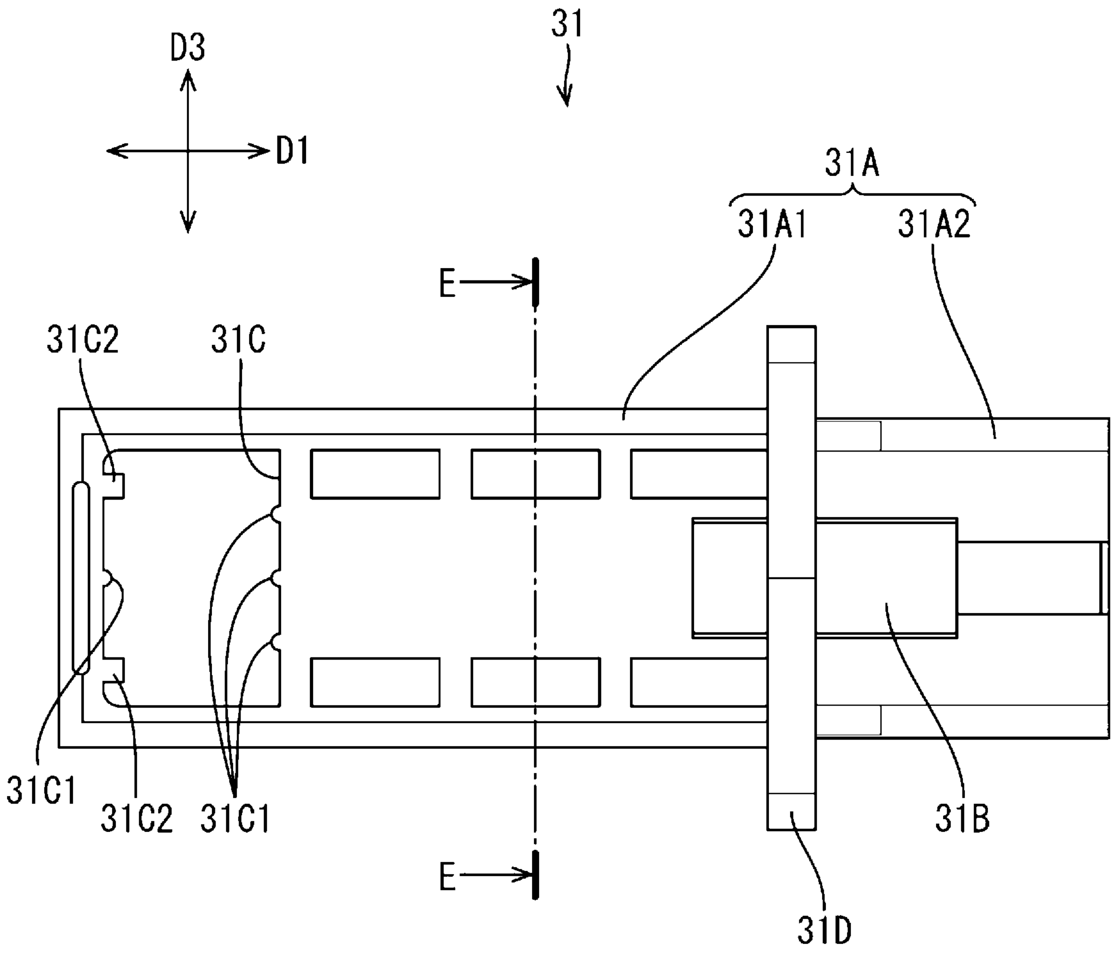
FIG. 13 is a plan view of the holding component.

As shown in FIGS. 12 and 13, the nut accommodating portion 31C is in the form of a substantially rectangular frame open in the second direction D2. A plurality of temporary holding ribs 31C1 in the form of ribs extending in the second direction D2 are formed on wall portions facing each other in the first direction D1, out of the peripheral wall of the nut accommodating portion 31C. In this embodiment, one temporary holding rib 31C1 is disposed on the front wall portion (wall portion on a side opposite to the flange portion 31D) of the nut accommodating portion 31C, and three temporary holding ribs 31C1 are disposed on the rear wall portion (wall portion on the side of the flange portion 31D).

A pair of positioning ribs 31C2 are formed on the front wall portion of the nut accommodating portion 31C. The pair of positioning ribs 31C2 are in the form of ribs extending in the second direction D2 and symmetrically disposed with respect to the temporary holding rib 31C1 on the front wall portion as a center. As shown in FIGS. 9 and 11, the pair of positioning ribs 31C2 can position the nut 35 in the third direction D3 by contacting the nut 35. The nut 35 is positioned and temporarily held in the third direction D3 by the pair of positioning ribs 31C2 and positioned and temporarily held in the first direction D1 by the plurality of temporary holding ribs 31C1.

In temporarily holding the nut 35 by the holding component 31, the nut 35 is mounted into the nut accommodating portion 31C of the holding component 31 in the second direction D2. Since the holding component 31 is made of the resin material softer than the housing 20, a press-fitting machine is not necessary and the nut 35 can be mounted by hand. Further, since the nut 35 is positioned in the first and third directions D1, D3 by the temporary holding ribs 31C1 and the positioning ribs 31C2, problems such as a position shift during press-fitting can be prevented.

As shown in FIG. 11, slits S2 are formed in wall portions facing each other in the third direction D3, out of the peripheral wall of the nut accommodating portion 31C, and deflection pieces 31C3 separated from the front accommodating portion 31A1 are provided by these slits S2. The deflection piece 31C3 is in the form of a cantilever projecting toward the flange portion 31D with the side of the positioning ribs 31C2 of the nut accommodating portion 31C as a base end part. A pair of the deflection pieces 31C3 are provided to face each other in the third direction D3. A pair of locking projections 31C4 are formed on facing parts of free end parts of the pair of deflection pieces 31C3.

As shown in FIG. 9, with the first terminal assembly 30 mounted in the housing 20, the pair of locking projections 31C4 are locked to the pair of locked portions 23C, whereby the first terminal assembly 30 is held in the housing 20. While the first terminal assembly 30 is being mounted into the housing 20, the deflection pieces 31C3 are so deflected and deformed that the locking projections 31C4 ride on the locked portions 23C. At the same time as the locking projections 31C4 ride over the locked portions 23C, the deflection pieces 31C3 are restored. Therefore, the first terminal assembly 30 can be mounted into the housing 20 by hand.

(Configuration of Flange Portion 31D)

As shown in FIG. 12, the flange portion 31D is in the form of a substantially rectangular plate when viewed from the first direction D1 and formed to protrude toward an outer peripheral side from the outer peripheral surface of the terminal accommodating portion 31A. The flange portion 31D includes a base wall 31D1, a peripheral wall 31D2 (see FIG. 11) extending rearward from an outer peripheral edge part of the base wall 31D1 and an assembly opening 31D3 penetrating through the base wall 31D1 in the first direction D1. The assembly opening 31D3 is disposed below the bottom wall portion 31A3 of the terminal accommodating portion 31A.

As shown in FIG. 3, the nut holding wall 23 is inserted through the assembly opening 31D3. The peripheral wall 31D2 is fit to the outer peripheral surface of the fitting portion 21B and the outer peripheral surface of the nut holding wall 23. By externally fitting the peripheral wall 31D2 to the fitting portion 21B and the nut holding wall 23 in this way, the holding component 31 is positioned in the second and third directions D2, D3 with respect to the housing 20. Further, the first terminal assembly 30 is positioned in the first direction D1 with respect to the housing body portion 21 by the contact of the tip of the fitting portion 21B with the base wall 31D1.

As shown in FIG. 9, the peripheral wall 31D2 has a function of positioning the first sealing member 21C fit on the outer peripheral surface of the fitting portion 21B. If the first sealing member 21C is mounted on the outer peripheral surface of the fitting portion 21B and the first terminal assembly 30 is mounted in the housing body portion 21, the peripheral wall 31D2 is externally fit to the outer peripheral surface of the fitting portion 21B, whereby the first sealing member 21C is prevented from being separated from the outer peripheral surface of the fitting portion 21B and positioned and held on the outer peripheral surface of the fitting portion 21B.

(Assembly Method of First Terminal Assembly 30)

Next, an assembly method of the first terminal assembly 30 is described. First, the third sealing member 33 and the insulating member 34 are mounted on the terminal 32.

Subsequently, the terminal 32 is mounted into the holding component 31 in the first direction D1. The terminal 32 is mounted while being positioned inside the terminal accommodating portion 31A. Since the nut accommodating portion 31C is covered from above by the terminal connecting portion 32B, the nut 35 is mounted into the nut accommodating portion 31D in the second direction D2 (from the side opposite to the terminal connecting portion 32B).

As shown in FIG. 11, if the nut 35 is mounted into the nut accommodating portion 31C, the nut 35 is temporarily held while being sandwiched and positioned in the first direction D1 by the plurality of temporary holding ribs 31C and is positioned in the third direction D3 by contacting the pair of positioning ribs 31C2. Further, the nut 35 is positioned in the second direction D2 by the contact of the upper surface of the nut 35 with the lower surface of the terminal connecting portion 32B. In the above way, the assembly of the first terminal assembly 30 is completed.

In an assembled state of the first terminal assembly 30, a relative positional relationship of the terminal 32, the third sealing member 33 and the nut 35 is determined by one component, i.e. the holding component 31. From this state, the first terminal assembly 30 is inserted into the fitting portion 21B of the housing 20 in the first direction D1 as shown in FIG. 10. During insertion, the tip of the terminal 32 enters the through hole 21A and the nut holding wall 23 enters the assembly opening 31D3 of the flange portion 31D. Further, the locking projections 31C4 of the holding component 31 ride on the locked portions 23C of the housing 20 and the deflection pieces 31C3 are deflected and deformed (see FIG. 9).

If the first terminal assembly 30 is properly mounted into the housing body portion 21, the peripheral wall 31D2 of the holding component 31 is externally fit to the fitting portion 21B and the tip of the fitting portion 21B comes into contact with the flange portion 31D as shown in FIG. 3, whereby the first terminal assembly 30 is positioned in the first direction D1 with respect to the housing body portion 21. Here, since the terminal 32 is positioned by the holding component 31, the third sealing member 33 is evenly squeezed between the terminal 32 and the inner wall of the through hole 21A and original waterproof performance is exhibited. As a result, the through hole 21A is sealed to stop water between the inside of the terminal accommodation wall 25 and the inside of the fitting portion 21B.

Further, as shown in FIG. 9, the nut 35 is tightly fit between the pair of side plate portions 23B and the outer peripheral surface of the nut 35 is engaged with the pair of side plate portions 23B. Here, since the housing 20 constituting the side plate portions 23B is made of the resin material harder and more durable than the holding component 31, the nut 35 positioned by the holding component 31 can be suppressed from rotating when the bolt is tightened.

(Mounting Method of Temperature Sensor 36)

Figure 6:
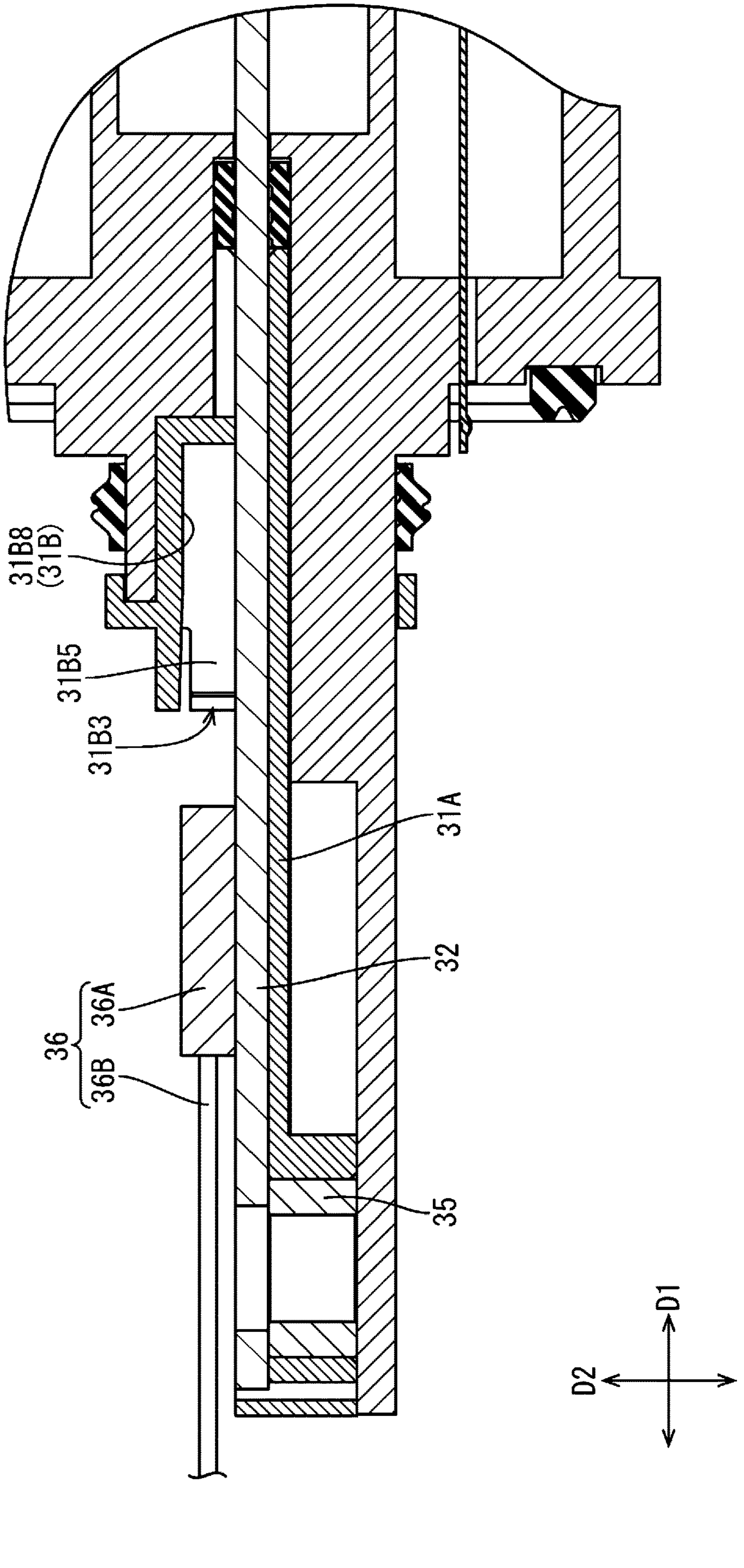
FIG. 6 is a view showing a state of mounting a temperature sensor in FIG. 5.

Next, a mounting method of the temperature sensor 36 is described. As shown in FIG. 6, the temperature sensor 36 is inserted through the insertion opening 31B3 in the first direction D1 with the terminal 32 accommodated in the terminal accommodating portion 31A. The temperature sensor 36 slides in contact with the guide surfaces 31B7 of the pair of resilient pieces 31B5, whereby the sensor body 36A is guided into the insertion opening 31B3. The sensor body 36A is inserted into the temperature sensor accommodating portion 31B while the pair of resilient pieces 31B5 are deflected. If the front end of the sensor body 36A rides over the pair of locking portions 31B6, the pair of resilient pieces 31B5 are restored and the pair of locking portions 31B6 are locked to the sensor body 36A from front (see FIG. 8). Further, the contact wall portion 31B4 comes into contact with the sensor body 36A from behind. In this way, the temperature sensor 36 is accommodated inside the temperature sensor accommodating portion 31B.

Since the temperature sensor accommodating portion 31B is formed with the pressing portion 31B8, an insertion force is applied when the sensor body 36A is inserted into the temperature sensor accommodating portion 31B. However, since the pressing portion 31B is in the form of a rib, the insertion force can be suppressed as compared to the case where the pressing portion 31B8 is formed to have a width (dimension in the third direction D3) nearly equal to that of the facing wall portion 31B1. Further, since the pressing portion 31B8 includes the inclined portion 31B9 and the projection amount thereof is large at the back of the temperature sensor accommodating portion 31B, the insertion force can be reduced near the insertion opening 31B3. Further, the sensor body 36A can be guided to the back of the temperature sensor accommodating portion 31B.

Since the insertion opening 31B3 of the temperature sensor accommodating portion 31B is open in the first direction D1 with the holding component 31 assembled with the housing 20, the temperature sensor 36 can be mounted after the first terminal assembly 30 is assembled with the housing 20. Further, the temperature sensor 36 can also be mounted before the first terminal assembly 30 is assembled with the housing 20.

(Functions and Effects of Embodiment)

(1) The connector 10 is provided with the housing 20, the terminal 32, the holding component 31 for holding the terminal 32 and the temperature sensor 36 for measuring a temperature of the terminal 32. The housing 20 includes the housing body portion 21 and the through hole 21A penetrating through the housing body portion 21 in the first direction D1. The holding component 31 can be assembled with the housing 20 by being inserted into the through hole 21A while holding the terminal 32. The holding component 31 includes the terminal accommodating portion 31A for accommodating the terminal 32 and the temperature sensor accommodating portion 31B disposed to be continuous with the terminal accommodating portion 31A in the second direction D2 orthogonal to the first direction D1. The temperature sensor accommodating portion 31B includes the facing wall portion 31B1 facing the temperature sensor 36 in the second direction D2, the pair of side wall portions 31B2 facing the temperature sensor 36 in the third direction D3 orthogonal to the first and second directions D1, D2, and the insertion opening 31B3 open in the first direction D1 with the holding component 31 assembled with the housing 20. Each of the pair of side wall portions 31B2 includes the deflectable and deformable resilient piece 31B5 on the opening edge part of the insertion opening 31B3. The resilient piece 31B5 includes the locking portion 31B6 for retaining the temperature sensor 36 inside the temperature sensor accommodating portion 31B. The facing wall portion 31B1 is formed with the pressing portion 31B8 projecting into the temperature sensor accommodating portion 31B. The minimum value L1 of the interval in the second direction D2 between the pressing portion 31B8 and the outer surface (upper surface) of the terminal 32 is set to be smaller than the dimension L2 in the second direction D2 of the temperature sensor 36.

According to this configuration, the temperature sensor 36 can be inserted into the temperature sensor accommodating portion 31B through the insertion opening 31B3 with the holding component 31 holding the terminal 32 assembled with the housing 20. The resilient pieces 31B5 are deflected in inserting the temperature sensor 36 into the insertion opening 31B3, and restored to a natural state after the temperature sensor 36 is accommodated into the temperature sensor accommodating portion 31B, whereby the temperature sensor 36 can be retained inside the temperature sensor accommodating portion 31B by the locking portions 31B6.

Further, since the facing wall portion 31B1 of the temperature sensor accommodating portion 31B includes the pressing portion 31B8 projecting into the temperature sensor accommodating portion 31B, the temperature sensor 36 can be pressed against the terminal 32 in the second direction D2. In this way, a temperature of the terminal 32 can be accurately measured.

(2) The pressing portion 31B8 is in the form of a rib extending in the first direction D1 and the projection amount thereof into the temperature sensor accommodating portion 31B increases from the insertion opening 31B3 toward the back of the temperature sensor accommodating portion 31*b* in the first direction D2.

According to this configuration, since the pressing portion 31B8 is in the form of a rib, an insertion force of the temperature sensor 36 into the temperature sensor accommodating portion 31B can be reduced by making a contact part of the pressing portion 31B8 with the temperature sensor 36 smaller. Further, since the projection amount of the pressing portion 31B8 increases from the insertion opening 31B3 toward the back of the temperature sensor accommodating portion 31B in the first direction D1, the temperature sensor 36 can be sufficiently pressed against the terminal 32 inside the temperature sensor accommodating portion 31B while the insertion of the temperature sensor 36 is guided.

(3) The terminal accommodating portion 31A includes the bottom wall portion 31A3 configured to contact the terminal 32 from the side opposite to the temperature sensor 36 in the second direction D2.

According to this configuration, the temperature sensor 36 and the terminal 32 can be sandwiched and arranged between the pressing portion 31B8 and the bottom wall portion 31A3 in the second direction D2. Thus, the contact of the temperature sensor 36 and the terminal 32 is easily ensured.

(Other Embodiments)

The above embodiment can be modified and carried out as follows. The above embodiment and the following modifications can be carried out in combination without technically contradicting each other.

Although the connector 10 provided with the first and second terminal assemblies 30, 40 is illustrated in the above embodiment, a connector may include only the first terminal assembly 30.

Although the holding component 31 includes the nut accommodating portion 31C and the flange portion 31D in the above embodiment, a nut accommodating portion and a flange portion may be omitted in a holding component.

Although the pressing portion 31B8 is in the form of a rib in the above embodiment, a pressing portion may not be in the form of a rib and may be, for example, in the form of a surface having a width nearly equal to that of a facing wall portion.

Although the pressing portion 31B8 includes the inclined portion 31B9 in the above embodiment, a projection amount of a pressing portion from a facing wall portion may be constant.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a housing;

a terminal;

a holding component for holding the terminal; and a temperature sensor for measuring a temperature of the terminal, the housing including a housing body portion and a through hole penetrating through the housing body portion in a first direction, the holding component being assemblable with the housing by being inserted into the through hole while holding the terminal, the holding component including a terminal accommodating portion for accommodating the terminal and a temperature sensor accommodating portion disposed to be continuous with the terminal accommodating portion in a second direction orthogonal to the first direction, the temperature sensor accommodating portion including a facing wall portion facing the temperature sensor in the second direction, a pair of side wall portions facing the temperature sensor in a third direction orthogonal to the first and second directions and an insertion opening open in the first direction with the holding component assembled with the housing, each of the pair of side wall portions including a deflectable and deformable resilient piece on an opening edge part of the insertion opening, the resilient piece including a locking portion for retaining the temperature sensor inside the temperature sensor accommodating portion, the facing wall portion being formed with a pressing portion projecting into the temperature sensor accommodating portion, and a minimum value of an interval in the second direction between the pressing portion and an outer surface of the terminal being set to be smaller than a dimension in the second direction of the temperature sensor.

2. The connector of claim 1, wherein:

the pressing portion is in the form of a rib extending in the first direction, and a projection amount of the pressing portion into the temperature sensor accommodating portion increases from the insertion opening toward back of the temperature sensor accommodating portion in the first direction.

3. The connector of claim 1, wherein the terminal accommodating portion includes a bottom wall portion configured to contact the terminal from a side opposite to the temperature sensor in the second direction.

* * * * *